Patented May 13, 1947

2,420,383

UNITED STATES PATENT OFFICE 2,420,383

PRODUCTION OF SULFONYL CHLORIDES FROM OLEFINS

John Ross, Manhasset, N. Y., assignor to Colgate-Palmolive-Peet Company, Jersey City, N. J., a corporation of Delaware No Drawing. Application December 20, 1940, Serial No. 370,990

2 Claims. (Cl. 204—162)

This invention relates to new organic compounds and compositions and to a novel method of making them. More particularly it relates to sulphonyl chlorides obtained from long chain olefinic materials and to their hydrolysis and neutralization products. Still more particularly it relates to sulphonyl chlorides of straight chain olefines. The invention also relates to the hydrolysis and neutralization products of the sulphonyl chlorides of the aforesaid olefines, which products possess unusual emulsifying, wetting, deterging, foaming and other surface-active properties.

This invention has for an object the production of solubilized products from relatively high molecular weight olefine hydrocarbons, particularly the straight chain olefines. A further object is the production of new and useful polysulphonyl chlorides from straight chain olefines. A still further object is the production of hydrolyzed and neutralized products from high molecular weight olefinic hydrocarbon sulphonyl chlorides. Still other objects will appear from the disclosures and claims given hereafter.

The above and other objects are accomplished by the following invention which consists in reacting a gaseous mixture of chlorine and sulphur dioxide with a mono-olefinic aliphatic hydrocarbon of high molecular weight, especially with a straight chain olefine. The sulphonyl chlorides thus obtained can be hydrolyzed and neutralized to mono- and polysulphonic acids and their salts.

It is surprising that these olefinic materials can be so reacted to prepare valuable sulphonyl halide and sulphonated products possessing unusual properties since the prior art procedures for forming such products from aliphatic hydrocarbons have been solely directed to the treatment of saturated materials of that type. A recently issued U. S. Patent No. 2,197,800 has described detailed steps for removing unsaturated substances from the materials to be treated so that only the saturated hydrocarbons were treated with the gaseous mixture of sulphur dioxide and chlorine.

As indicated above, the process of this invention, broadly, is directed to the treatment of mono-olefinic hydrocarbons having at least six carbon atoms simultaneously with sulphur dioxide and a halogen, preferably chlorine. It has been found that when a straight chain monoolefine hydrocarbon having at least twelve carbon atoms has been converted into an organic sulphonyl halide by this process and then hydrolyzed into an organic sulphonate, the product has exceptional washing, emulsifying and wetting properties, different from those of the sulphonates of olefines of lower molecular weight and/or those having branched chains. However, the sulphonates of the olefinic hydrocarbon materials having at least six carbon atoms prepared according to the broader principles of the present invention, possess as a class unusual surface-active and other properties.

According to the preferred process of this invention, an olefine hydrocarbon is contacted in a liquid state with the vapors of sulphur dioxide and chlorine by passing the vapors in very finely divided state through the body of the olefinic material to be reacted. The reaction mixture is illuminated by actinic light, e. g. sunlight, light from an incandescent bulb, carbon arc, ultra violet lamp, and/or monochromatic light. The process is continued until sulphonation and the desired degree of halogenation (if any) of the product is obtained, usually until about one part chlorine and three parts of sulphur dioxide per one part of hydrocarbon has been used. When the starting material or mixture is fluid at 70-90° C., the reaction can but need not be carried out in a solvent. However, if the starting material or mixture is not normally liquid under reaction conditions, it is then preferably dissolved in a suitable inert solvent such as carbon tetrachloride and hexachloroethane, or if necessary the reaction can be satisfactorily carried out by simply suspending the material in a suitable reaction medium. The concentration of the starting material in the solvent should be such that the resultant solution is fluid enough for efficient stirring. Concentration may thus vary from about 1% to as high as 40 to 50%, depending on the starting material and the solvent.

The sulphonyl chlorides thus obtained which apparently consist of mono- and polysulphonyl chlorides and chlorinated mono- and polysulphonyl chlorides, predominating in polysulphonyl chlorides may be purified by the method given in the applicant's copending application Ser. No. 281,885, filed June 29, 1939. The sulphonyl halide products are hydrolyzed with boiling water or aqueous solutions of alkaline salts and/or acids or alkalies, preferably with an alkaline solution, to form the unusual aliphatic sulphonates. The aqueous solution of the sulphonate salt products may then be extracted with ether, gasoline or the like, to remove any remaining organic unsaponifiable material therefrom. Inorganic salts such as sodium chloride may be removed by extraction of the sulphonate with ethyl alcohol, butyl alcohol and the like. Dialysis of the solutions of the sulphonates will likewise produce this result. The reaction may be carried substantially to completeness and in such cases it is not essential that the unsaponifiable material be removed since the quantity thereof is relatively small.

The temperature of treatment may be between about 0° and 100° C. or even higher, but is preferably between 40° and 100° C., a temperature of 60° to 70° C. is usually satisfactory. When employing a solvent, it is often desirable to carry out the reaction at the boiling point of the solvent at atmospheric or under increased pressure, with suitable return or reflux of the vaporized solvent, because of the increased solubility of the olefine hydrocarbon and the accelerated reaction rate at the higher temperatures. In no case should the pressure be increased to such a degree that the chlorine or sulphur dioxide is liquefied. The temperature of the olefine may be raised to about this range to initiate the reaction and, depending on the rate of combination and heat evolved, the heating may be continued, removed, or even cooling of the reaction mixture be required. The heating or cooling may be direct by means of preheated or precooled reactants, diluents and/or vapors; or by vaporization of admixed liquids; or it may be indirect by passing of heat exchange fluids through pipes, jacket and/or the like. The temperature control is very important in the production of materials of superior properties.

The chlorine and sulphur dioxide may be added separately and substantially simultaneously, but are preferably premixed. In the chlorine-sulphur dioxide gaseous mixture, an excess of sulphur dioxide is preferably used in order to reduce the amount of extraneous chlorination. Satisfactory results may be obtained by using from ¼ mole to as high as 15 to 20 moles of sulphur dioxide per mole of chlorine. Amounts of 2 to 6 moles of sulphur dioxide per mole of chlorine are preferred in order to enhance the solubilization characteristics and to reduce extraneous chlorination. In some cases desirable products may be obtained by only partial reaction of the hydrocarbon with the chlorine and sulphur dioxide. The preferred amounts are about one part of chlorine and three parts of sulphur dioxide per part of hydrocarbon. However, a large excess of chlorine and sulphur dioxide may often be desirable. The rate of introduction of chlorine and sulphur dioxide may be regulated as desired so as to get efficient absorption of the gases within a reasonable reaction time. The reaction may be conducted in the presence of water, or subsequent thereto, the products may be brought in contact with water without rapid decomposition.

The desired novel products are of a complex nature and preferably contain one or more halogen substituents in addition to the sulphonyl halide or sulphonate groups, but this is not essential. In hydrolyzing the reaction products containing halogen and sulphonyl halide groups, it is possible to hydrolyze the products so that only the sulphonyl halide is converted to a true sulphonate but substantially all the organic halogen substituents, if any, remain on the product. This is best accomplished by hydrolyzing the product with aqueous alkaline solutions at a temperature not substantially greater than 100° C., but higher temperatures can be used.

The following example is given for the purpose of illustrating the invention but is not intended to be limiting on the scope thereof.

*Example*

62 parts by weight of cetene are treated in a cylindrical Pyrex vessel in sunlight with a finely distributed mixture of 95 parts by weight of chlorine and 190 parts by weight of sulphur dioxide at a temperature of about 60° C. The gain in weight is about 95 parts. The product is hydrolyzed on a steam bath with a 10% aqueous sodium hydroxide solution. The mixture is extracted with ether to remove any unsaponifiable material. Residual ether is removed by heating and the product is dried on the rolls to obtain a light colored product having unusually high foaming and deterging properties in a 90% yield.

It is possible to employ any other mono-olefinic hydrocarbons having at least six carbon atoms, but the most effective agents are prepared from the straight chain olefine hydrocarbons of this class, especially those having twelve to twenty-four carbon atoms such as n-heptadecene, n-docosene, n-pentadecene, n-tetradecene, n-dodecene, n-octadecene, and n-cetene. The olefinic linkage is usually in the 1—2 position; however, it is possible to employ the straight chain olefines having the olefinic linkage in any other position such as those obtained by dehydration of long chain alcohols produced from hydrogenated long straight chain ketones.

Other organic materials may be treated along with one or more of the straight chain and/or polymerized olefines. Among these materials are organic compounds having at least six carbon atoms including paraffin hydrocarbons, such as dodecane, hexane, heptadecane, octadecane and hexadecane; petroleum hydrocarbons, such as paraffin wax, slack wax, white oil, kerosene, gas oil, lubricating oil, and raffinates of lubricating oil, gas oil and kerosene extractions; alicyclic compounds; fatty alcohols; fatty acids and their esters; and halogenated derivatives of the foregoing including the olefinic materials.

It has been found that if the temperature during the chlorination-sulphonation reaction is allowed to rise above about 100° C., the mixture may become dark colored. With the temperature kept at about 60° to 70° C. during this reaction, the products are generally of good color and odor.

Sulphur dioxide and chlorine are the preferred reactants, but other halogens may be used in place of or in combination with chlorine.

After the reaction is complete, chlorine may be passed through alone to bleach the product. Inert gases such as nitrogen, flue gases, carbon dioxide, and/or air may be passed through the reaction products to sweep out any gaseous products or reactants. When solvents are employed, these may be removed by distillation under reduced pressure at moderate temperatures, e. g. 60° C.

The sulphonyl halides may be hydrolyzed to a sulphonate with aqueous alkali, and then be bleached by passing chlorine gas through the aqueous solution of said sulphonates. Gases such as sulphur dioxide, nitrogen, air, carbon dioxide and flu gases may then be passed through the solution to remove excess chlorine and/or other gases. The treatment with chlorine may render the product acidic and it may be neutralized with additional alkali.

Among the factors which affect the reactions are the type and intensity of illumination, concentration of the constituents, the time of treatment, the temperature of reaction, the pressure, the ratio of halogen and sulphur dioxide gas, the halogen employed, the type and purity of olefinic material being treated, and the presence or absence of catalysts and materials which promote or retard the reaction. The portion of the spectrum beginning in the blue and extending into the ultra-violet is particularly effective in assisting the reaction.

The apparatus for conducting the reaction may be made of glass, enameled vessels, or corrosion-resistant alloys. Any apparatus suitable for reacting a liquid with a gas may be used. The process for preparing the new products may be conducted by a continuous procedure whereby the olefine or a solution containing the olefine is continuously passed downwardly in a countercurrent flow to a rising gas mixture of sulphur dioxide and chlorine through a column packed with rings, beads, fibers or other shapes of corrosion-resistant metal, glass or other suitable inert material to increase the contact surface. The product may then be continuously bleached with a countercurrent stream of chlorine gas, continuously washed with a countercurrent flow of water, continuously admixed with an aqueous alkali solution with vigorous agitation in order to hydrolyze the sulphonyl halide product, extracted continuously with a countercurrent flow of gasoline either or the like, continuously heated and flashed to remove retained solvent from the aqueous solution, continuously bleached with a countercurrent stream of chlorine gas, continuously neutralized, and continuously dried on heated rolls or by spraying with heated air. Suitable equipment for recovering excess gases, including sulphur dioxide, chlorine and hydrogen chloride may be provided.

The products may be in the form of the acids or the salts of sodium, potassium, calcium, magnesium, lithium, ammonia, mono-, di-, and triethanolamines and -glycerolamines, aminotrimethylolmethane, amylamines, methylamines, aniline, pyridine and like metals or compounds. The bases or carbonates corresponding to the above metals or compounds or solutions thereof may be used for hydrolyzing the sulphonyl halide products. The concentration of the alkali may be varied over a wide range. Aqueous solutions containing from about 5% to about 40% have considerable utility. Although the hydrolysis is best carried out at about the boiling point of the hydrolytic medium, it may, if desired, be carried out at lower temperature for a longer period of time, or in some cases there may be considerable advantage in carrying out the hydrolysis at a higher temperature under pressure. The time required for the hydrolysis may vary from a few minutes to many hours.

The sulphonate salts may be interchanged by the treatment of a solution of one salt of the novel compounds in a suitable solvent such as ethyl alcohol or isopropyl alcohol with a concentrated aqueous solution of a soluble salt of an inorganic acid having a different cation than that of the product to be treated. This treatment also serves to a major extent to remove inorganic salts, such as sodium chloride, from the product.

The sulphonate products obtained from the material prepared in accordance with the present invention, either as acids or salts, have good wetting, solubilizing, deterging, sudsing, water-softening, dispersing, emulsifying, penetrating and equalizing properties. Since their calcium and magnesium salts are water-soluble, they operate efficiently in hard as well as in soft water. They are good wetting agents both in hot and cold treating baths, and function effectively in the presence of large quantities of inorganic salts.

The materials prepared according to the process of this invention may be used alone or admixed with other emulsifying agents including soaps, rosinates, long chain alcohol sulphates, monoglyceride monosulphates, sulphonated mineral oil extracts, turkey red oil, lecithin; glycerolamines and ethanolamines and their soaps; alkaline soap builders such as sodium carbonate, sodium silicates, sodium phosphates and borax; water-soluble, water-softening phosphorus compounds of the type of tetraphosphoric, pyrophosphoric or hexametaphosphoric acid and their alkali metal, ammonia, and amine salts or alkyl esters; acids including boric acid, citric acid and tartaric acid; coloring matter such as dyes, lakes, pigments; abrasives and fillers such as silica, pumice, feldspar, precipitated chalk, infusorial earth, bentonite, talc, starch and air; liquids including carbon tetrachloride, perchlorethylene, trichlorethylene, glycerine, ethyl alcohol, glycol, tetrahydrofurfuryl alcohol, phenol, cyclohexanol, water, tetralin, hexalin, pine oil, mineral oil, mineral oil extracts and naphtha; perfumes and deodorants; fats, oils, fatty acids, monoglycerides, vitamins, waxes, gums, glue, resins; germicides such as phenol mercury chloride, phenyl mercury nitrate, phenyl mercury chloride; styptics such as aluminum chloride, adrenalin and cephalin; and/or any of the common water-soluble salts such as sodium sulphate, chloride, acetate, citrate, tartrate, perborate, bicarbonate, sesquicarbonate, hypochlorite, thiosulphate and hydrosulphite, or the corresponding ammonium and potassium salts thereof. The type of addition agent to be used, of course, will depend on the ultimate use of the new compositions.

The final composition, with or without one or more addition agent, may be formed into beads, flakes, bars, chips, crystals, powders, solutions, liquid or plastic emulsions, pastes, creams, salves, or any other forms desired. The ingredients may be mixed by any of the common methods such as grinding, stirring, kneading, crutching, fusing, and drying of mixed solutions by rolls, spray or otherwise.

The various products and compositions of this invention may be used for various purposes such as washing compositions for wood, metal, stone, glass, brick, masonry and painted surfaces; insecticides; cements; abrasive compositions; antiseptics; water-softeners; deodorants and disinfectants; water paints and polishes; sizes, glues, and adhesives such as shellac and casein compositions; liquid, solid and paste tooth and mouth detergents; shampoos; cosmetics; laundry detergents and other textile agents including laundry blueing, bleaching, dyeing, mercerizing, softening, lubricating and discharging compositions; depilatories; dust preventing compositions; fire extinguishing compositions; drain, lavatory and radiator cleaners; anti-freezing, anti-fogging, and anti-corrosion compositions; wood impregnants; electrolytic baths; etching compositions; metal pickling; tanning agents and fat-liquors for leather; photographic solutions; paint, stain and grease removers; dry-cleaning compositions; rug cleaners; petroleum de-emulsifying compositions; lubricating oil and fuel compositions; ore flotation; fruit washing; fat splitting; organic synthesis; preparation of germicidal agents; preparation of resins and plasticizers; and any compositions requiring wetting, washing, emulsifying, penetrating, solubilizing, dispersing and like agents.

As many apparently widely different embodiments of this invention may be made without departing from the spirit and scope thereof, it is to be understood that the application is not limited to the specific proportions or embodiments thereof except as defined in the following claims.

I claim:

1. A process which comprises reacting a straight-chain mono-olefine having from 12 to 24 carbon atoms in a liquid state with gaseous sulphur dioxide and gaseous chlorine in the ratio of about ¼ to 20 moles of sulphur dioxide to 1 mole of chlorine, maintaining the temperature of the reaction mixture within the range of about 0° to 100° C., and continuing the reaction at least until a sulphonyl chloride derivative of the mono-olefine has been formed.

2. A process which comprises reacting cetene in a liquid state with gaseous sulphur dioxide and gaseous chlorine in the ratio of about ¼ to 20 moles of sulphur dioxide to 1 mole of chlorine, maintaining the temperature of the reaction mixture within the range of about 0° to 100° C., and continuing the reaction at least until a sulphonyl chloride derivative of the cetene has been formed.

JOHN ROSS.

REFERENCES CITED

The following references are of record in the file of this patent:

UNITED STATES PATENTS

| Number | Name | Date |
|---|---|---|
| 2,212,786 | McQueen | Aug. 27, 1940 |
| Re. 20,968 | Reed | Jan. 3, 1939 |
| 1,362,355 | Saunders et al. | Dec. 14, 1920 |
| 2,193,824 | Lockwood et al. | Mar. 19, 1940 |
| 2,202,791 | Fox et al. | May 28, 1940 |
| 2,263,312 | Reed | Nov. 18, 1941 |